June 13, 1950

G. E. GLISS 2,511,203

APPARATUS FOR SIMULTANEOUSLY ADVANCING AND
WORKING PLASTIC MATERIAL

Filed Nov. 13, 1946

INVENTOR
G.E. GLISS
BY
ATTORNEY

Patented June 13, 1950

2,511,203

UNITED STATES PATENT OFFICE 2,511,203

APPARATUS FOR SIMULTANEOUSLY ADVANCING AND WORKING PLASTIC MATERIAL

George E. Gliss, Baltimore, Md., assignor to Western Electric Company, Incorporated, New York, N. Y., a corporation of New York Application November 13, 1946, Serial No. 709,530

2 Claims. (Cl. 18—13)

This invention relates to apparatus for simultaneously advancing and working plastic material, and more particularly to extrusion screws for simultaneously forcing plastic material through extrusion cylinders and working the material.

In the manufacture of extruded products, such as insulated conductors, plastic material, such as vulcanizable compounds including rubber or synthetic rubber-like materials or compounds of thermoplastic material, sometimes are worked to thoroughly mix and plasticize the material so that it may be extruded readily. The material then is inserted into an extruder, which extrudes the material upon a conductor, while the material is plastic. Such working operations are relatively expensive and require considerable handling of the material. In the past, there has been no apparatus available for reducing or substantially eliminating the necessity of the working operations prior to the insertion of the material into the extruder.

An object of the invention is to provide new and improved apparatus for simultaneously advancing and working plastic material.

A further object of the invention is to provide new and improved extrusion screws for simultaneously forcing plastic material through extrusion cylinders and plasticizing the material as it is forced through the extrusion cylinders.

An apparatus illustrative of the invention is provided with a thread, which has an alternately increasing and decreasing depth along the length of the screw so that a compound advanced by the screw along an extrusion cylinder is repeatedly expanded and contracted, whereby the compound is plasticized and thoroughly mixed as it is advanced through the extrusion cylinder.

A complete understanding of the invention may be obtained from the following detailed description of an extrusion screw forming a specific embodiment thereof, when read in conjunction with the appended drawings, in which.

Figure 1:
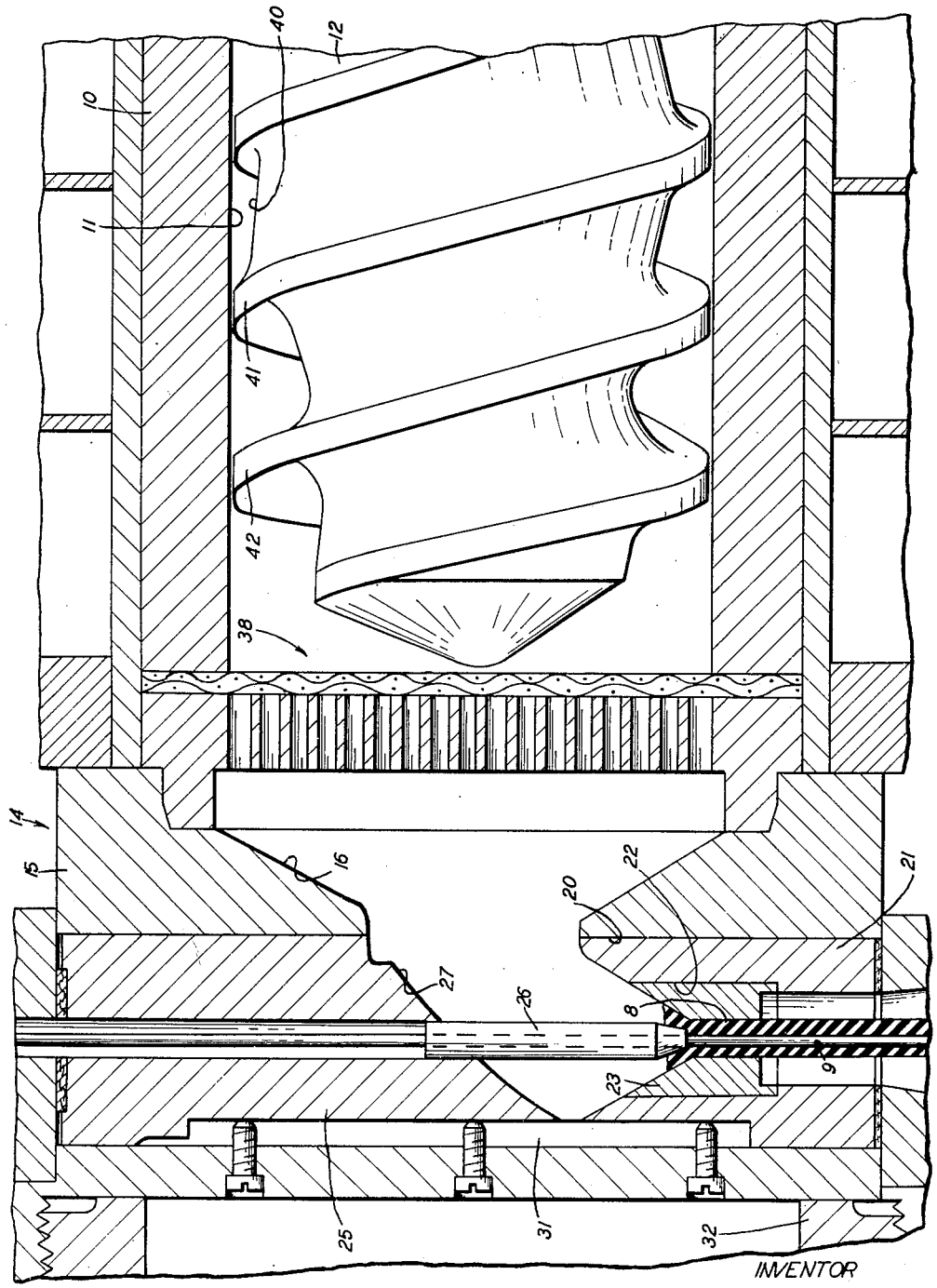
Fig. 1 is a fragmentary, horizontal section of an extrusion apparatus including an extrusion screw forming one embodiment of the invention.

Referring now in detail to the drawings, there is shown in Fig. 1 a continuous extrusion apparatus for forming a covering 8 from a compound of plastic material, such as a compound including rubber, a synthetic rubber-like material, or a thermoplastic material, around a filamentary conductor 9, which may be bare or may be covered with a textile or plastic covering. The extrusion apparatus includes a heated extrusion cylinder 10 having a cylindrical bore 11 formed therein in which a stock screw 12 is rotatably mounted. The stock screw is rotated by a shaft 13 (Fig. 2) to force the plastic compound under a high pressure to an extruding head 14 (Fig. 1). The extruding head includes a body member 15 having a tapered opening 16, which forms a continuation of the bore 11 and communicates with a bore 20 formed in the extruding head transversely of the tapered opening 16. An annular die holder 21 positioned in the exit end of the bore 20 has a counterbore 22 formed therein in which is mounted a forming die 23.

The conductor 9 is advanced toward the right, as viewed in Fig. 1, by suitable conductor-advancing means, such as a capstan (not shown), through a core tube holder 25 and a core tube 26, which extends from the exit of the core tube holder 25. The core tube holder is provided with an inclined concave surface 27 for deflecting the compound toward the die 23. An aligning plate 31 maintains the die holder 21 and the core tube holder 25, and thereby the die 23 and the core tube 26, centered relative to each other in the bore 20, and a retaining nut 32 holds these elements in the extruding head 14.

The stock screw 12 includes generally cylindrical root portions 39 and 40 and threads 41 and 42 extending outwardly from the roots 39 and 40. The bore 11 has a uniform diameter along its entire length, and encloses the stock screw 12 from a receiving portion thereof, designated by the letter A (Fig. 2), to a delivery portion thereof, which is designated by the letter G. The cylinder 10 also is provided with a charging opening 45 near the receiving portion A through which material to be extruded may be introduced into the bore 11. The diameters of the threads 41 and 42 are identical, and each diameter thereof is uniform throughout the entire lengths of these threads. The pitches of the threads 41 and 42 are identical with each other throughout the length of the screw 12, but the pitch of each of these threads constantly decreases slightly from the entrance portion A to the end portion G of the screw.

Figure 3:
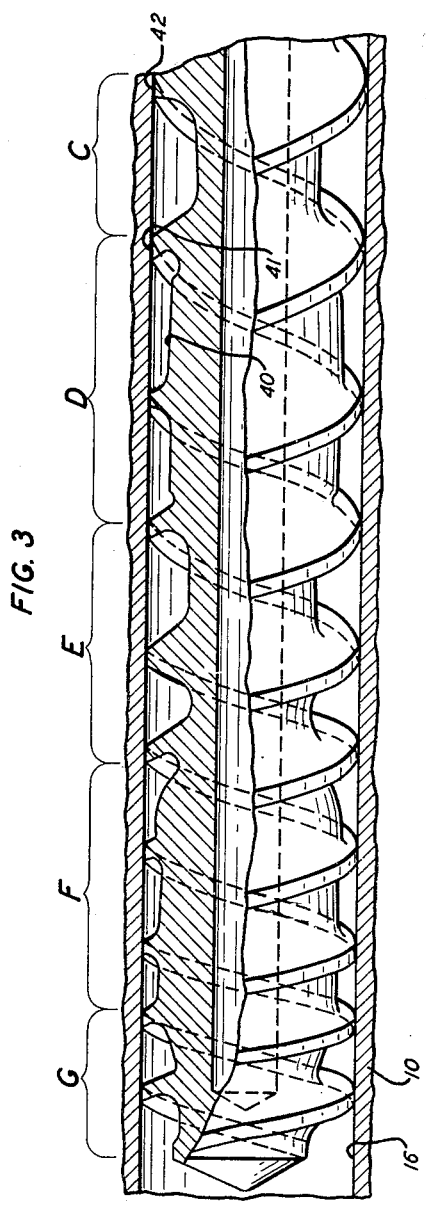
Fig. 3 is a reduced, fragmentary, vertical section of another portion of the apparatus.

The roots 39 and 40 of the stock screw 12 also are identical with each other, but each of the roots 39 and 40 varies from a diameter substantially less than that of the threads 41 and 42 in the receiving portion A to a diameter in a milling portion of the screw, designated by the letter B, substantially larger than the diameter thereof in the receiving portion A. The diameter of the roots 39 and 40 suddenly decreases sharply from the milling portion B to a delivery portion, designated by the letter C (Fig. 3). The diameter of the roots 39 and 40 more gradually increases from the delivery portion C to a milling portion, designated by the letter D, and similarly, are alternately small in a delivery portion, designated by the letter E, large in a milling portion, designated by the letter F, and small in the delivery portion G.

The material is simultaneously advanced along the bore 11 in the cylinder 10 and worked. The diameter of the portions of the roots 39 and 40 in the delivery section A is slightly less than that of the portions of the roots in the delivery section C. Similarly, the diameters of the roots 39 and 40 in delivery sections E and G progressively increase. Likewise, the diameters of the roots in the milling sections increase slightly from B to D and from D to F. The progressive increase in relative diameters from the entrance end portion of the screw to the delivery end portion thereof causes the material in each of the milling sections to be worked to substantially the same extent even though the material becomes progressively more plastic and hence less responsive to working from the receiving end of the screw to the delivery end thereof.

Figure 2:
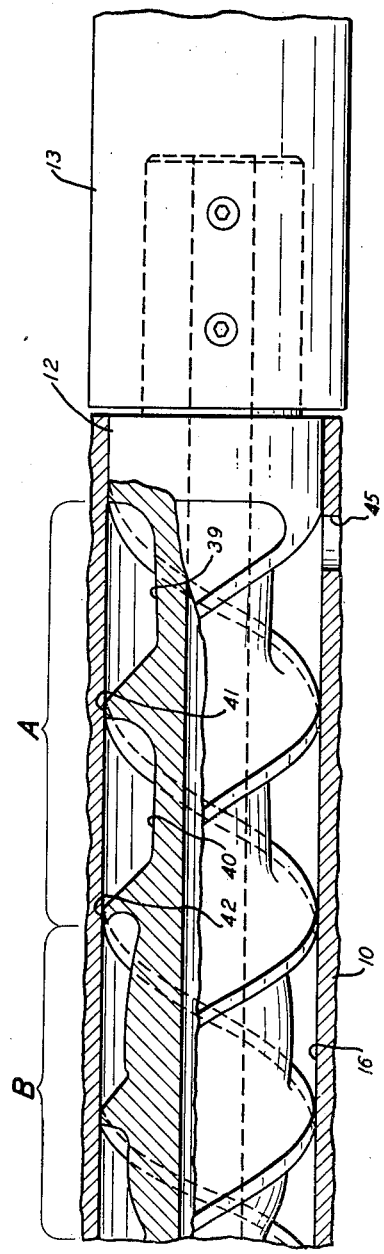
Fig. 2 is a reduced, fragmentary, vertical section of a portion of the apparatus.

In the operation of the apparatus described hereinabove, the stock screw 12 is rotated in the extrusion bore 11 by the shaft 13 (Fig. 2). Relatively cold plastic material, e. g. material at room temperature, is introduced into the bore 11 through the opening 45, and the threads 41 and 42 force the compound to the left, as viewed in Fig. 2. The compound is forced from the deep delivery portion A of the screw into the relatively shallow milling portion B so that the compound is compressed greatly in the portion B and is rubbed between the wall of the extrusion bore 16 in that portion and the roots 39 and 40. The pressure on the compound is suddenly released as it enters the delivery portion C, but the material is compressed again and is milled in the milling portion D. The pressure is relieved somewhat in the deep delivery portion E, the material is milled and subjected to a high pressure again in the milling portion F, and the pressure thereon is relieved in the delivery portion G. Thus, the pressure on the compound is alternately high and low as it is forced along the bore 11 in the body portion 10. The alternate compressing and relieving of the pressure on the compound combined with the rubbing of the compound over the wall of the extrusion bore 16 heats the material and tends to knead and wipe the material until the material is thoroughly worked and broken down.

The passages for the material between the threads in the delivery portions A, C, E and G are much larger in cross-section than the passages in the milling portions B, D and F so that the material is extruded to some extent through the milling portions and the velocity of the material in the milling portions is higher than the velocity of the material in the delivery portions. The high pressure, high velocity material in the milling portions empties into the low pressure, low velocity material in the delivery portions thereby creating turbulence and working the material. The action of the extrusion screw 12 also serves to thoroughly mix the material. By the time the material leaves the end of the screw, the screw has thoroughly heated, mixed and plasticized it so that it may be easily extruded and formed into a smooth covering by the forming die 23.

The above-described extrusion screw 12 serves to heat, plasticize and mix the plastic material as the material is being forced through the continuous extrusion apparatus. Hence, the necessity of pre-milling and pre-heating operations, which formerly were required to plasticize the material before it could be introduced into a continuous extrusion apparatus, are minimized by the extrusion screw 12, and much labor and equipment may be saved by the above-described extrusion screw.

The above-described apparatus is suitable for plasticizing and extruding thermoplastic compounds as well as thermosetting compounds with little or no pre-plasticizing operations on the compounds.

What is claimed is:

1. An extruding apparatus, which comprises an extrusion cylinder having a bore of a uniform diameter, and a stock screw having a receiving end and a delivery end mounted rotatably in the bore, the stock screw having formed therein a helical groove with a deep delivery portion, a shallow working portion, a second deep delivery portion and a second shallow working portion in the named order from the receiving end of the screw toward the delivery end thereof, the second-mentioned deep portion being shallower than the first-mentioned deep portion and the second-mentioned shallow portion being shallower than the first-mentioned shallow portion.

2. An extruding apparatus, which comprises an extrusion cylinder having a bore of a uniform diameter, and an extrusion screw having a receiving end and a delivery end mounted in the bore, said screw having a helical groove therein alternating repeatedly from deep portions to shallow portions from the receiving end of the screw to the delivery end thereof, the deep portions of the groove being progressively shallower from the receiving end of the screw to the delivery end thereof and the shallow portions of the grooves being progressively shallower from the receiving end of the screw to the delivery end thereof, whereby the screw works plastic material with increasing intensity as the material is advanced from the receiving end thereof to the delivery end thereof.

GEORGE E. GLISS.

REFERENCES CITED

The following references are of record in the file of this patent:

UNITED STATES PATENTS

| Number | Name | Date |
| --- | --- | --- |
| 1,167,096 | Price | Oct. 12, 1915 |
| 1,320,718 | Steinle | Nov. 4, 1919 |
| 1,886,592 | Royle | Nov. 8, 1932 |
| 1,904,884 | Royle | Apr. 18, 1933 |
| 2,138,670 | Upton | Nov. 29, 1938 |
| 2,319,859 | Hale | May 25, 1943 |
| 2,407,503 | Magerkurth et al. | Sept. 10, 1946 |